(12) United States Patent
Chan (10) Patent No.: US 7,089,425 B2
(45) Date of Patent: Aug. 8, 2006

(54) REMOTE ACCESS AUTHORIZATION OF LOCAL CONTENT

(75) Inventor: Man Chan, San Jose, CA (US)

(73) Assignee: CI4 Technologies, Inc., Mountain View, CA (US)

( * ) Notice: Subject to any disclaimer, the term of this patent is extended or adjusted under 35 U.S.C. 154(b) by 85 days.

(21) Appl. No.: 10/392,591

(22) Filed: Mar. 18, 2003

(65) Prior Publication Data

US 2004/0187027 A1   Sep. 23, 2004

(51) Int. Cl.
H04L 9/32 (2006.01)
(52) U.S. Cl. .................. 713/189; 713/156; 713/165; 726/26; 726/27; 380/201
(58) Field of Classification Search ............... 713/165, 713/191, 156, 189; 707/10; 709/203; 380/200–201, 380/243; 726/26–30; 715/500, 501.1
See application file for complete search history.

(56) References Cited

U.S. PATENT DOCUMENTS

| | | |
|---|---|---|
| 3,829,833 A | 8/1974 | Freeny, Jr. |
| 3,911,397 A | 10/1975 | Freeny, Jr. |
| 3,924,065 A | 12/1975 | Freeny, Jr. |
| 3,970,992 A | 7/1976 | Boothroyd |
| 4,070,692 A | 1/1978 | Parks |
| 4,071,911 A | 1/1978 | Mazur |
| 4,112,421 A | 9/1978 | Freeny, Jr. |
| 4,209,787 A | 6/1980 | Freeny, Jr. |
| 4,217,588 A | 8/1980 | Freeny, Jr. |
| 4,220,991 A | 9/1980 | Hamano et al. |
| 4,270,182 A | 5/1981 | Asija |
| 4,305,098 A | 12/1981 | Mitchell |

(Continued)

FOREIGN PATENT DOCUMENTS

EP   855638 A1 * 7/1998

(Continued)

OTHER PUBLICATIONS

Simon, Richard. Microsoft Windows 200 API SuperBible. © 2000 Sams Publishing. Chapter 3, Section 1 "Creating the Main Window".*

(Continued)

*Primary Examiner*—Hosuk Song
*Assistant Examiner*—Thomas Gyorfi
(74) *Attorney, Agent, or Firm*—Barry N. Young (57) ABSTRACT

Network users are authorized individual access during a log-on session to encrypted content on content media at the user without the necessity of individualizing the content media for the particular user. The content may comprise multimedia data. The content media, which may be mass produced and distributed, includes a computer program which generates a unique configuration identifier upon instantiation of the program to begin a user access session. The program creates a virtual directory structure for the content that is uniquely determined for that session by the configuration identifier. The configuration identifier is uploaded to a remote server which uses the configuration identifier with other information identifying the content media and the user authorize user access. The remote server creates and downloads to a browser of the user an encrypted message containing URLs for accessing the content in the virtual directory structure and containing transformations of a decryption algorithm and decryption keys for the encrypted content. Encrypted multimedia content selected by the user is stored in a temporary file, decrypted in a moving time window, and rendered After rendering, the decrypted portion of the temporary file is scrambled to preclude further access.

45 Claims, 7 Drawing Sheets

U.S. PATENT DOCUMENTS

| | | | |
|---|---|---|---|
| 4,528,643 A | 7/1985 | Freeny, Jr. | |
| 4,555,803 A | 11/1985 | Hirose | |
| 4,685,055 A | 8/1987 | Thomas | |
| 5,103,476 A | 4/1992 | Waite et al. | |
| 5,138,712 A | 8/1992 | Corbin | |
| 5,222,134 A | 6/1993 | Waite et al. | |
| 5,260,999 A | 11/1993 | Wyman | |
| 5,319,705 A | 6/1994 | Halter et al. | |
| 5,457,746 A | 10/1995 | Dolphin | |
| 5,495,411 A | 2/1996 | Ananda | |
| 5,509,070 A | 4/1996 | Schull | |
| 5,548,645 A | 8/1996 | Ananda | |
| 5,555,303 A | 9/1996 | Stambler | |
| 5,576,843 A | 11/1996 | Cookson et al. | |
| 5,592,511 A | 1/1997 | Schoen et al. | |
| 5,629,980 A * | 5/1997 | Stefik et al. | 705/54 |
| 5,638,513 A | 6/1997 | Ananda | |
| 5,699,512 A | 12/1997 | Moriyasu et al. | |
| 5,715,453 A | 2/1998 | Stewart | |
| 5,745,642 A | 4/1998 | Ahn | |
| 5,765,152 A | 6/1998 | Erickson | |
| 5,790,664 A | 8/1998 | Colety et al. | |
| 5,809,245 A | 9/1998 | Zenda | |
| 5,825,876 A * | 10/1998 | Peterson, Jr. | 705/52 |
| 5,892,825 A * | 4/1999 | Mages et al. | 705/51 |
| 5,933,500 A | 8/1999 | Blatter et al. | |
| 5,937,164 A * | 8/1999 | Mages et al. | 709/218 |
| 6,067,622 A * | 5/2000 | Moore | 713/200 |
| 6,161,179 A * | 12/2000 | Seidel | 713/168 |
| 6,226,618 B1 * | 5/2001 | Downs et al. | 705/1 |
| 6,240,401 B1 * | 5/2001 | Oren et al. | 705/40 |
| 6,298,446 B1 * | 10/2001 | Schreiber et al. | 713/201 |
| 6,389,403 B1 * | 5/2002 | Dorak, Jr. | 705/52 |
| 6,405,265 B1 * | 6/2002 | Kronenberg et al. | 719/321 |
| 6,505,160 B1 * | 1/2003 | Levy et al. | 704/270 |
| 6,611,812 B1 * | 8/2003 | Hurtado et al. | 705/26 |
| 6,674,703 B1 * | 1/2004 | Oshima | 369/53.11 |
| 6,804,708 B1 * | 10/2004 | Jerding et al. | 709/220 |
| 2002/0016776 A1 * | 2/2002 | Chu et al. | 705/52 |
| 2002/0021805 A1 * | 2/2002 | Schumann et al. | 380/201 |
| 2002/0067914 A1 * | 6/2002 | Schumann et al. | 386/98 |
| 2002/0095420 A1 * | 7/2002 | Hovsepian | 707/10 |
| 2002/0129002 A1 * | 9/2002 | Alberts et al. | 707/1 |
| 2002/0144153 A1 * | 10/2002 | LeVine et al. | 713/201 |
| 2002/0172366 A1 * | 11/2002 | Peterka et al. | 380/277 |
| 2002/0174366 A1 * | 11/2002 | Peterka et al. | 713/201 |
| 2002/0186844 A1 * | 12/2002 | Levy et al. | 380/231 |
| 2003/0005464 A1 * | 1/2003 | Gropper et al. | 725/115 |

FOREIGN PATENT DOCUMENTS

| | | |
|---|---|---|
| EP | 1061516 A1 * | 12/2000 |
| JP | 2001086113 A * | 3/2001 |

OTHER PUBLICATIONS

"How Can I enable and disable Windows XP's built-in zip support?" © 2000 WindowsITPro.com http://www.windowsitpro.com/Article/ArticleID/24720/24720.html?Ad=1.*

Schneier, Bruce. Applied Cryptography, 2$^{nd}$ Edition. © 1996 Bruce Schneier. pp. 28-31 and p. 216.*

* cited by examiner

REMOTE ACCESS AUTHORIZATION OF LOCAL CONTENT

BACKGROUND OF THE INVENTION

This invention relates generally to encryption systems and methods for authentication and access, and more particularly to encryption systems and methods for networks for remotely authorizing local access to digital content stored on content media.

Developers of digital information, for example multimedia information such as streaming video and/or audio information, or of other digital data or code, face a number of significant problems in delivering the digital content to end users and then controlling access to the digital content. Content owners and providers are interested in a distribution mechanism which allows them to efficiently and inexpensively produce and distribute the digital content to end users, while at the same time controlling access and preventing unauthorized copying and use of the digital content. Some content owners who mass produce and distribute content on physical media have relied upon obtaining the agreement of end users to licenses limiting use or copying before authorizing access to the content. While licenses may afford the content owner a legal remedy, they are not effective in preventing unauthorized activities. Once unprotected content has been publicly distributed, it is difficult to prevent unauthorized copying and use of the content. Even encrypted content which requires a key for use may be easily duplicated and used without authorization.

Instead of distributing physical media, some content owners rely upon electronic delivery of content over a network, such as the Internet. This provides a content owner somewhat greater control over the content, since the content owner can require actual identification of the end user and an agreement to license terms before downloading the content to the user. However, once a content is downloaded, the content owner loses the ability to control access to the content.

Controlling access to content may be desirable not only to prevent unauthorized distribution and use by others, but also, as in the case of training materials, to require the user to progress through the content in a controlled and predetermined manner. It may be desirable, for example, to require users to complete chapters in a preassigned order and to perform certain exercises after completing one chapter before going to the next. Although the content owner can regulate this through online delivery of the content, once a content has been delivered to the user, the problems of unauthorized copying and use continue to exist. Moreover, online delivery of broadband content has other problems which favors delivery of content in other forms. Streaming video, for example, may have quality problems due to network or system bandwidth limitations or be incompatible with corporate firewalls which, for security purposes, may block streaming content.

Loss of revenue is another significant problem faced by content owners because of their inability to effectively control access to content following distribution and their inability to monitor and charge for subsequent uses of their content. A training video, for example, has value each time it is used and the content owner has had no effective way of deriving revenue for each use of such content after it has been distributed. Even content delivered on line may be stored, copied and reused once it has been delivered to a user.

It is desirable to provide systems and methods which address these and other problems faced by owners of digital content in distributing and controlling each access to the content, and it is to these ends that the present invention is directed.

SUMMARY OF THE INVENTION

The invention addresses the foregoing and other problems in distributing and controlling access to digital content by affording an efficient and cost effective distribution mechanism for digital content in a form which enables the content owner to control and, accordingly, derive revenue for, every access to the content. In accordance with the invention, the content may be distributed to network users on physical media or distributed electronically to the users over the network and stored on local media at the user. The content media may comprise one or more files of encrypted content and an executable program which, among other things, manages access to and decryption of the content. The executable program may receive dynamic updates to its core library at runtime from a remote server, without user intervention, to enable its engine to be replaced and its process to be changed dynamically. At the same time, the server can download to the client any updated content. The encrypted content and the executable program may be the same on all copies of the content media so that the content media may be mass produced and distributed. Yet, in accordance with the invention, the decryption code and access to each content file may be individualized on an access-by-access basis so that access can be controlled by a remote server.

In accordance with one aspect, the invention provides a method of controlling access by a user to encrypted content on content media that includes instantiating at the user a current instance of an executable program which is stored on the content media. The executable program generates a configuration identifier that is unique to the current instance of the executable program, and creates a virtual directory structure for content on the content media using the configuration identifier. The content in the virtual directory structure has a location that depends upon the configuration identifier, and has a path which corresponds to its location. The user communicates with a remote server, and upon being granted access is provided with information on selectable content and the corresponding path of such content within the virtual directory structure. The user is further provided from the remote server a decryption key for decrypting the selected content.

In accordance with a further aspect, the invention provides a method of controlling access by a user to encrypted content stored on content media at the user. An executable program also stored on the content media is instantiated. The user communicates with a remote server to obtain authorization to access the content. The user is provided information on selectable content, and the remote server provides the user a decryption code and a decryption key for decrypting content selected by the user.

In accordance with another aspect, the invention provides a method of controlling access to encrypted content on content media at a user which includes storing on the content media encrypted content files and an executable program. The executable program includes a first portion which operates as a server, a second portion that generates a unique identifier for each instantiation of the executable program, a third portion that creates, for each instance of the executable program, a virtual directory structure for the content files on the content media, and a fourth portion for decryption. The content files in the directory structure have locations which are determined by the unique identifier and each location has a corresponding path. The user is authorized access by a remote server, which communicates an associated key to the executable program for decrypting an encrypted content file selected by the user.

In yet another aspect, the invention provides content media for controlling access by a user to encrypted content files stored in a repository on the content media. The content media includes a computer program that provides a local server for communicating with a browser of the user, a generator which is operable upon each instantiation of the program to generate a unique configuration identifier that corresponds to the current instance of the program. The program further includes code for creating upon instantiation of the program a virtual directory structure for the encrypted content files stored in the repository such that each content file has a location within the structure which is determined by the configuration identifier and which has a corresponding encrypted path. The program further includes code for receiving keys for decrypting selected content files and for decrypting the corresponding encrypted paths for the locations of the selected files.

In accordance with more specific aspects of the invention, access by a user to encrypted content on the content media requires instantiation of an executable program on the content media for every access session. The executable program comprises a local HTTP server which communicates with a remote server via a browser at the user, and randomly generates a different directory structure for the content on the media for each instance of the program, i.e., for each access session. Each different directory structure is constructed using a unique configuration identifier, e.g., a random number, which is generated for every instantiation of the executable program, and knowledge of which is necessary for access to the encrypted content. Since the directory structure will be different for each session, saving a link to particular content during one session will not permit future access to the protected content during a later session. Moreover, each access session may be uniquely identified by a session identifier generated by the remote server upon authorization of access by the user. The session identifier can be provided to the executable program following a log-on process and can be used to maintain the integrity of access during a particular session. The session identifier will be valid for only a single session, and may be valid for only a limited period of time during a session, necessitating an additional log-on, further making it difficult for an unauthorized user to break into the content.

DESCRIPTION OF PREFERRED EMBODIMENTS

The present invention is particularly applicable to protecting and controlling access to digital multimedia content, such as streaming video and/or audio, and will be described in that context. It will be appreciated, however, that this is illustrative of only one utility of the invention, and that the invention may also be employed for protecting and controlling access to other types of content, including program code.

Figure 1:
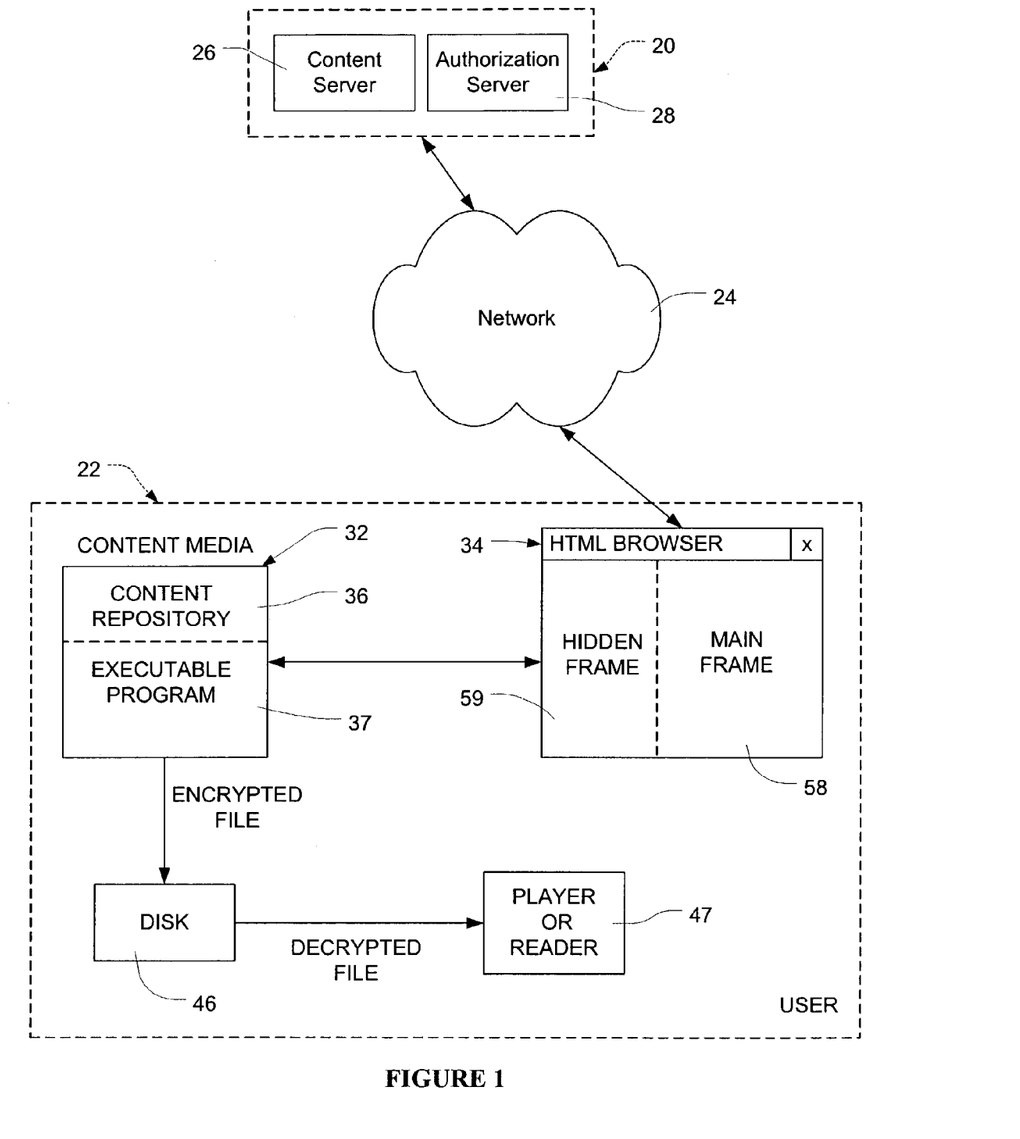
FIG. 1 is a block diagram of a first computer network system of the type with which the invention may be employed.

FIG. 1 illustrates a computer network system of the type with which the invention may be employed. As shown, the system may include a remote server computer 20 connected to a local user computer 22 for the exchange of digital information over a network 24 which may comprise, for example, the Internet. As shown, remote server 20 may comprise one or more computers, including a content server 26 and an authorization server 28. Content server 26 may be associated with the content provider which supplies the protected content and registers and logs on users who are authorized to access that content. The authorization server 28 interacts with an authorized local user 22 following verification of the local user's identity, to manage and control access to the content 36 stored on content media 32 at the local user. The functions performed by content server 26 and authorization server 28 may be performed in separate server computers as, for example, at separate locations as described below in connection with FIG. 8, or they may be performed as separate functions in a single remote server computer 20 as shown in the figure.

Content media 32 may comprise any storage media capable of storing the protected digital content in encrypted form, executable programs, and an associated parameter file, as will be explained in more detail shortly. The content media 32 may comprise, for example, optical storage media, such as a CD-ROM, a DVD-ROM, a SmartCard, semiconductor memory, e.g., flash memory, or magnetic storage media such as a hard disk, a floppy disk, etc. Additionally, the content storage media may comprise removable physical media, such as a CD-ROM, etc., which may be mass produced, physically distributed to end users, and inserted into the user's computer, or it may be an internal hard disk in the local user's computer onto which the content is downloaded. Irrespective of the form of the content media, as will be described, the invention advantageously permits all copies of the content media to be the same without the necessity of individualizing each media with a different access code, while still enabling the remote server to control and authorize each access to the content media on an access-by-access basis. The authorization server 28 can, therefore, not only control which content files are accessed or the order in which they are accessed by an individual user, but may also charge fees to individual users for each access.

Figure 2:
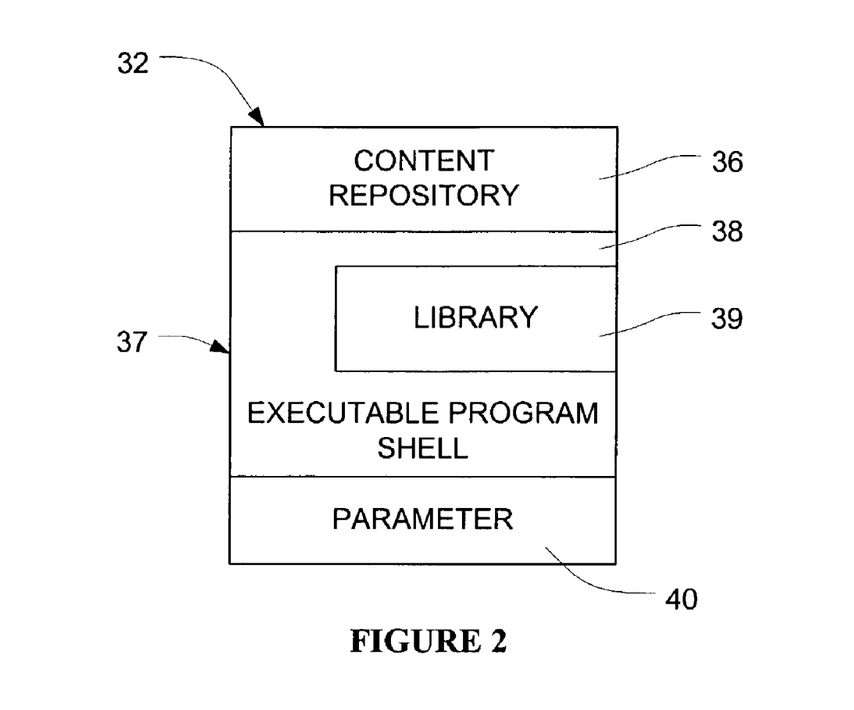
FIG. 2 is a diagrammatic view of the organization of a content media in accordance with the invention.
Figure 3:
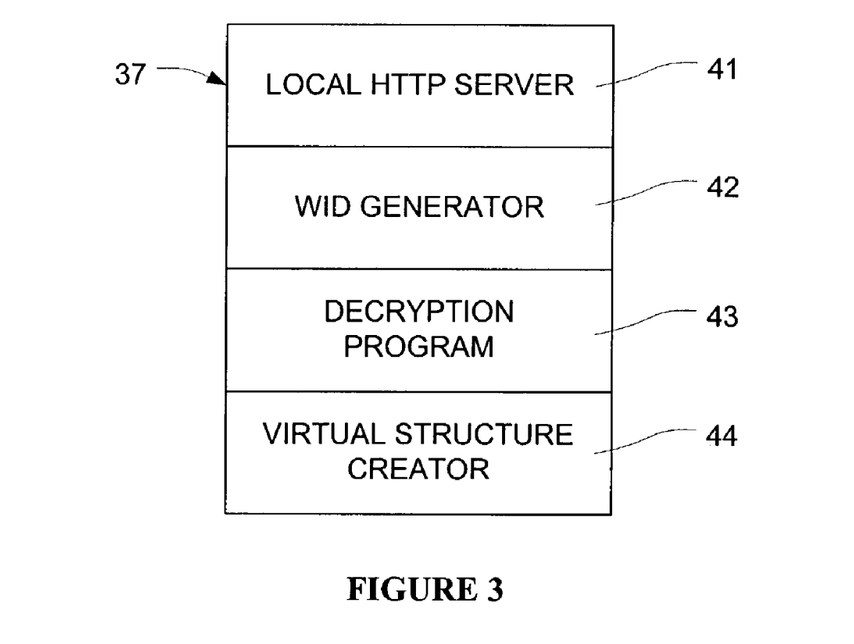
FIG. 3 is a diagrammatic view of the organization of an executable program included on the content media of FIG. 2.

As shown in FIG. 1, local user computer 22 may comprise a personal computer, e.g., a Windows PC, that employs a standard HTML browser 34, such as Internet Explorer or a Netscape browser, for communicating via network 24 with remote server 20. As shown in FIG. 2, in addition to storing content, which may comprise a plurality of separate content files in a content repository 36, content media 32 may store an executable program 37 comprising a shell program 38, a library 39 and a parameter file 40. The library may be dynamically updatable at run time in order to update or change the process performed by the executable program. The parameter file may contain an autorun facility that can be used to automatically run the executable program upon loading of the media onto the local user's computer. As shown in FIG. 3, the executable program 37 comprises a local HTTP server 41 that interfaces the content media to the HTML browser 24 which communicates with remote server 20 via the network 24. Using the HTML browser as a middle man in this manner avoids the prohibition in the HTTP protocol of two servers directly communicating. The executable program may additionally comprise a configuration identifier (WID) generator 42, e.g., a random number generator, decryption algorithms 43, which will be described more fully below, and a program 44 for creating a virtual directory structure for the content using WID for each logon session, as will also be described. The user computer 22 may also include associated storage 46, such as a hard disk, and an output mechanism 47 for the decrypted content. Output mechanism 47 may comprise a media player, e.g., Microsoft Windows Media Player, when the content stored in content repository 36 is streaming video and/or audio. When an encrypted content file is accessed from the content media 32, it may be provided to a temporary file, e.g., the hard disk 46, and decrypted as it is being accessed by the media player 47 for output to the user. Prior to describing this process, the process for producing the encrypted content for storage on the content media and the executable program will first be described in more detail.

Initially, a content provider may create one or more plaintext content files $C_1, C_2, \ldots C_i$ which the provider desires to protect and control access to and store these in encrypted form on content media 32. The content files may include streaming data, for example. The content provider may also be responsible for registering users who wish to access the content, and creating associated user identifications and passwords to enable the users to log on to the remote (content) server for authorization to gain access to the content. Each plaintext content file $C_i$ may be encrypted using an encryption algorithm $E_i$ and a key $K_i$ to produce an encrypted content file $C'_i$:

$$C'_i = E_i(K_i, C_i)$$

The encryption algorithm $E_i$ may be a publicly known encryption process, such as the Data Encryption Standard (DES), or it may be some other public or non-public encryption algorithm. (As used herein, depending on context, the term "algorithm" refers either to a process embodied in a computer program or to the program itself.) The encryption process creates the encrypted content $C'_i$ by using the encryption algorithm $E_i$ and the secret $K_i$ to process the plaintext content $C_i$ in a well known manner. There is associated with the encryption algorithm a decryption algorithm, $D_i$, such that when the encrypted content $C'_i$ and the secret key $K_i$ are processed using the decryption algorithm, the plain text content $C_i$ is returned, i.e.:

$$C_i = D_i(K_i, C'_i)$$

Each plaintext content file $C_i$ may be encrypted using the same encryption algorithm E with the same or different keys $K_i$, or encrypted with different encryption algorithms. The keys may be collected and stored in a key file or repository in the remote server. The remote server uses the keys in the key file, in a manner which will be described shortly, to provide decryption keys for decrypting content on the content media. Following encryption, images of the encrypted content files $C'_i$ are stored in the content repository 36 on the content media 32. In addition to the encrypted content files, the content media may also store a product identifier (PID) that signifies the content stored on the media. The PID may be stored in the same repository as the encrypted content.

As previously described, the content media will also store the executable program 37 which includes a local HTTP server 41 occupying a unique TCP port, e.g., TCP "localhost 8688". This local server communicates with the browser 34 using the HTTP protocol. It runs in a listening mode; and will not on its own initiate a connect to any process in the user computer or to the network, and will not be contacted directly by any server connected to the network. This information exchange technique by which the local server communicates with the remote server via the browser avoids any problems which may be caused by local firewalls. In the case of a removable content media, such as a CD-ROM, the executable program and/or parameter file may also include an auto-run facility to automatically instantiate, i.e., run, an instance of the executable program when the content media is inserted into the drive of a user's computer. The structure and operation of the executable program will be described in more detail below.

As will be also described in more detail, for security reasons the content media does not store either the decryption algorithm, $D_i$, or the keys, $K_i$, for decrypting the encrypted content on the content media, and the actual decryption algorithm (code) and keys are never directly provided to the running executable program on the content media. Rather, transformations of the decryption algorithm and keys which are session-specific are downloaded to the browser from the remote server and uploaded from the browser to the local server during a session. These are used to provide access to the protected content during that particular session, but are useless for other logon sessions. The executable program does, however, include decryption algorithms 43, i.e., programs, that include a communications security key generation algorithm, $F_K$, as will be explained, for use in producing session specific keys ($WID_d$) for decrypting secure communications from the remote server during a session.

Figure 4:
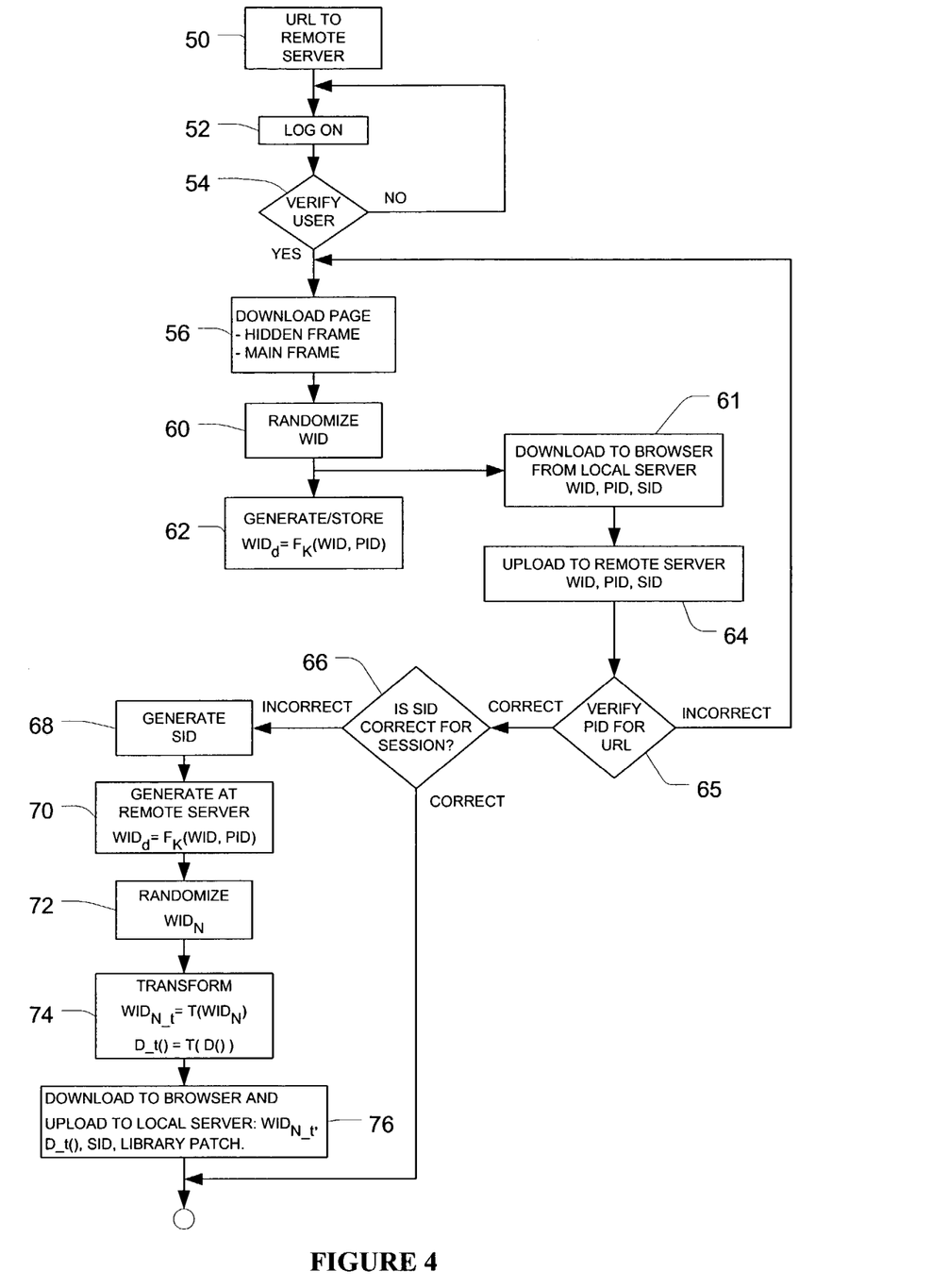
FIG. 4 is a flow chart illustrating a process in accordance with a first embodiment of the invention by which a user is authorized access to encrypted content, and an executable program is enabled to provide the content.

FIG. 4 is a flow chart which provides an overview of a first embodiment of a process which authorizes access to protected content and enables an executable program on the content media to provide decrypted content to a local user.

The process may begin by instantiating an instance of the executable program on the content media according to the stored parameter file. In the case of a renewable CD-ROM, the auto-run feature of the operating system may instantiate the executable program to automatically run upon insertion of the CD-ROM into the user computer. Otherwise, where the auto-run feature in Windows is disabled, or where the executable is on the hard disk in the user computer, the user may instantiate the executable program. The executable program will preferably run in the background, without user input, awaiting further instructions until the process is terminated.

The first step in the access process is to contact the remote server (at 50) for log on and authorization. The user may manually load the remote server URL (location) into the HTML browser 34, or the running executable program may load the URL to the browser. In response, the remote server downloads, at 52, a login page which is configured to accept a user ID, e.g., name, and password. These are returned to the remote server. If the remote server verifies (at 54) the user, it downloads to the browser, at 56, a second page containing a main frame 58 and a hidden frame 59 (see FIG. 1). This may be done by concurrently downloading two URLs on the second page for the two frames, where the hidden frame has a column size of zero, and is thus not seen. Representative HTML code for this is:

---
Frames.htm
---

```
<html>
   <frameset cols="0,*" frameborder="no">
      <frame name="Hidden" src=http://127.0.0.1:8688/info.htm noresize>
      <frame name="Main" src=http://www."RemoteServer".com/
      V1234/authorization.htm" no resize>
   </frameset>
</html>
```

The "0,*" term in the line "frameset cols" sets the size of one frame, i.e., the hidden frame, at 0, and the size of the second main frame to be the remaining columns. The location "127.0.0.1 :8688" is the TCP web address of the local server.

The main frame may display an instruction to the user to insert the appropriate content media, e.g., CD-ROM, if not already done. The hidden frame is mainly used to communicate with the executable program on the content media. The main frame may also contain JavaScript which instructs the hidden frame to periodically attempt to load a page from the local server (executable program 37). The downloaded second page from the remote server may also contain a session identifier (SID) which is a unique identifier, such as a random number generated by the remote server, that corresponds to the current log-on session. At 61, the browser 34 downloads from the local server a page that preferably contains an auto-submit form for automatically submitting information back to the remote server, with fields for certain identifiers, including the product identifier (PID) assigned to the media, the session identifier (SID) previously generated by the remote server, and a configuration identifier (WID) for the current session generated by the WID generator 42 (see FIG. 3) of the executable program. The remote server uses this technique to detect the existence of the content and the media on which it resides.

The configuration identifier, WID, is preferably a random number generated (at 60, FIG. 4) upon instantiation of the executable program on the content media. It identifies the particular configuration of the running instance of the executable program, and is session specific. The purpose of the WID is to introduce unpredictability as to the internal configuration of the running instance in order to enhance security. WID is used primarily for two purposes. One purpose is to generate a random virtual web directory structure for the content on the content media for each session. The other is to combine with the PID to form a communications security key, $WID_d$, for decrypting the first message from the remote server to the browser. This key, $WID_d$, may be formed using a key generation algorithm (process) $F_K$ with WID and PID as follows:

$$WID_d = F_k(WID, PID)$$

This key will be generated by the decryption process 43 of the executable program 37, stored temporarily at the local server, and used to decrypt the first message downloaded from the remote server. The key generation algorithm $F_k$ is preferably known only to the executable program on the content media and to the remote (authorization) server. Using this generated key, the communication between the remote server and the local server may be secured using any encryption algorithm, $F_b(\ )$, e.g., the Data Encryption Standard (DES) algorithm.

Returning to FIG. 4, after the executable program (local server) downloads to the browser (at 61) the expected page containing identifiers WID, PID and SID with an auto-submit form, the browser may then automatically upload this page to the remote server, at 64, sending to the server (in the clear) the identifiers WID, PID and SID.

The remote server verifies (at 65) that the PID corresponds to the log-on URL associated with the content media and uses the SID to identify the session (user). If not, the remote server may seek to determine (at 66) whether the SID matches the current log-on session. If it is different, the remote server knows that the currently running instance of the executable program belongs to another log-on session, and a new SID will be generated (at 68). If the SID is the same, the process continues with that SID by directly creating and downloading the content selection page to the browser. This content selection page creation will be described in more detail.

Next, at 70, both the remote server and the local server generate a communication key, $WID_d$, using the same key generation algorithm $F_K$ and identifiers PID and WID, as previously described. The remote server uses this key to encrypt the next communication to the local server (at 76). The remote server also generates, at 72, a new communications key $WID_N$ for encrypting messages from the remote server to the local server following the first message. The communication security key $WID_N$ is preferably generated as a random number at the remote server.

As noted previously, for security reasons the content media preferably does not store either the decryption algorithm D( ) or the encryption key K necessary for decrypting the encrypted content on the content media, and this information is never directly provided to the executable program on the content media. Rather, the remote server generates and supplies to the local server transformations of the communication key $WID_N$ and the decryption algorithm, D( ), using one or more transformation functions, T( ), as follows:

$$WID_{N\_t} = T(WID_N)$$

$$D\_t(\ ) = T(D(\ ))$$

The transformation functions T( ) are selected to have the property that content $C_1$ encrypted using an encryption algorithm E and an encryption key $K_1$ may be decrypted to recover the plaintext using the transformed decryption algorithm $D\_t(\ )$ and the transformed encryption key $K_{1\_t}$. The transformed decryption algorithm cannot be used directly to decrypt the original encrypted content. It requires the transformed decryption key. Furthermore, the transformations are preferably selected such that if $WID_{N\_t}$ and $D\_t(\ )$ are compromised, it will be difficult and practically impossible to work backwards from these transformed entities to obtain the actual communication key $WID_N$ and the actual decryption algorithm D( ). Accordingly, compromising the transformations of these two items will not afford access to encrypted content during a subsequent session. Moreover, each session preferably uses a different transformation function to provide even greater security to the content. This may be accomplished either by changing variables in a particular transformation function for each session, or, preferably, by using different transformation functions for different sessions. A preferred way of accomplishing this is as follows.

The invention may employ two separate transformations, one ($E_K$) for the original encryption key K and a different transformation for the decryption algorithm D. A transformation of the key may be created by encrypting the key K and a random number X to form:

$$K\_t = E_K(K, X)$$

Content C may be encrypted to form encrypted content C' by encrypting the original content with an encryption algorithm E and the original key K as:

$$C' = E(C, K)$$

and decrypted using transformations of the key and decryption algorithm D as:

$$C = D(C', K)$$

where $$K = D_K(K\_t, X).$$

The transformed decryption algorithm D_t( ) is created by combining two constantly changing elements, these are the encryption of the original key K and the random number X.

Next, at 76 in FIG. 4, the remote server encrypts a first message $P_1$ containing $WID_{N\_t}$, D_t( ), SID, and, optionally, a library patch, using the first communication key $WID_d$ and a secret encryption algorithm having a corresponding decryption algorithm known to the local server. The browser uploads the page with the encrypted message (page $P'_1$) to the local HTTP server. The local server decrypts the first message $P'_1$ from the remote server using $WID_d$ to recover the plaintext $P_1$, but thereafter uses the transformed communications security key $WID_{N\_t}$ and the transformed decryption algorithm D_t( ) included in the first message $P_1$ to decrypt subsequent communications during the session. It also uses the transformed decryption algorithm D_t( ) from the first message to decrypt URLs to provide access to the encrypted content on the content media. It also uses the transformed decryption algorithm D_t( ) to decrypt the encrypted content. The session identifier SID signifies the current log-on session as described. As previously indicated, an optional library patch and content data supplement also may be included in the first message sent to the local server to modify or enhance the behavior of the executable program as well as to supplement and update the local content. This permits the authentication mechanism, for example, or other portions of the executable program, to be changed dynamically. It also enables bug fixes, updates, and the like to be transmitted to the content media. At the local server, the executable program will decrypt the received page using $WID_d$ (which was generated and stored at 62), install the transformed decryption code D_t( ) from the message so it can decrypt the other information in the message, and, if a library patch is included, load the new library and initialize it.

The foregoing process shown in FIG. 4 results in the local server being fully enabled to deliver content securely to the user in response to receiving a special trigger upon selection by the user of desired content from a content page displayed on the browser (main frame). The special trigger is a URL link to the local server, as will be described shortly. First, however, the virtual directory structure for the content on the content media will be described.

Figure 5:
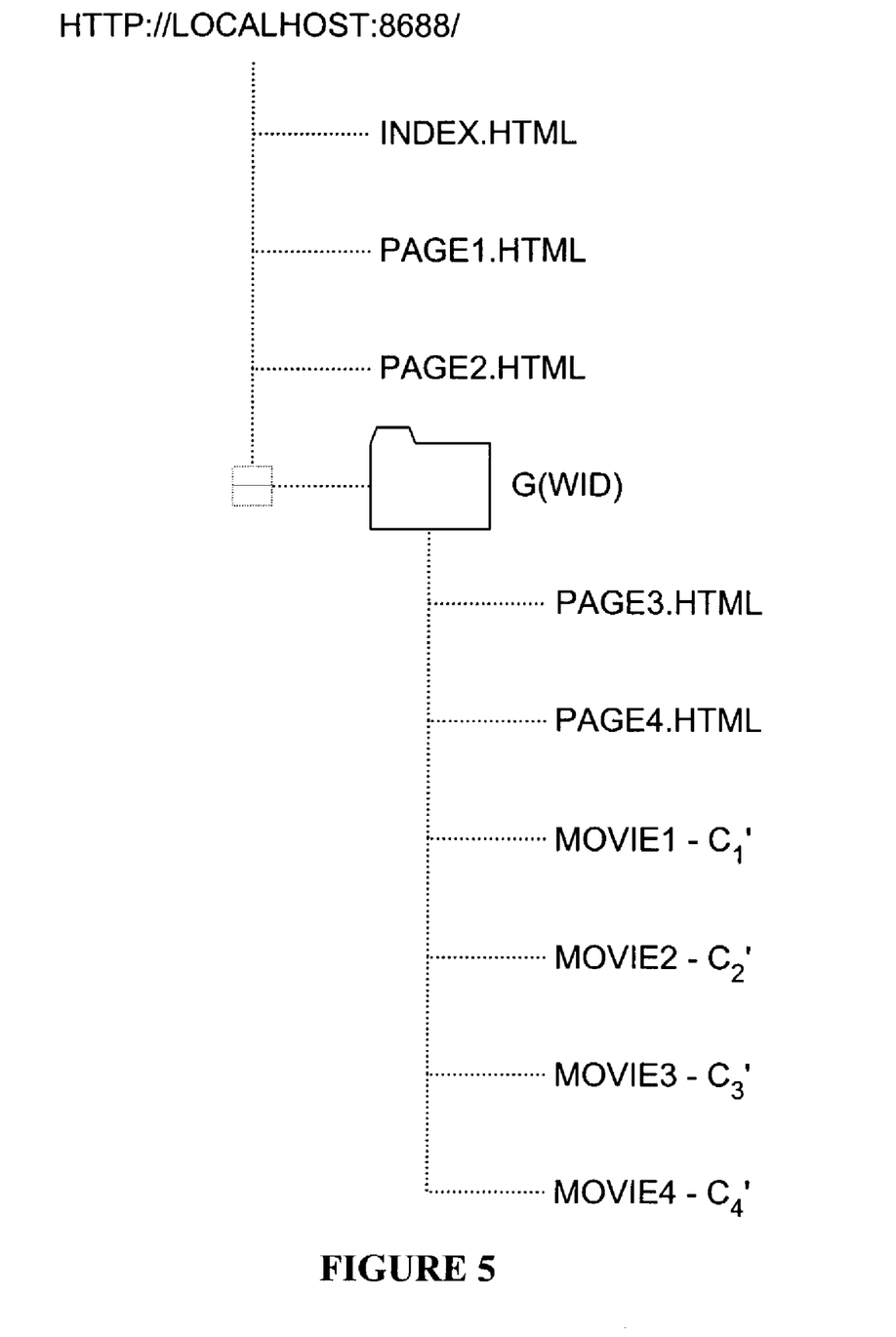
FIG. 5 is a diagrammatic view of an example of a virtual directory structure for encrypted content on the content media.

As previously described, the executable program includes a portion which runs as a local HTTP server. To a user, the local server appears as a normal web resource, and it preferably constructs two main resource directory structures. One is for the normal unprotected web resource that can be defined by a static URL, e.g., http://localhost:8688/index.html. This enables the resource to be located using the static URL whenever the program is running. Additionally, the executable program constructs a session-specific virtual directory structure according to the content files in the repository on the content media. This directory for the protected content is identified by one or more separate URL links which point to protected resources in the randomly generated directory structure. As an example, the directory structure for a repository containing encrypted content files "movie1"—$C_1'$, "movie2"—$C_2'$, "movie3"—$C_3'$ and "movie4"—$C_4'$ may be as shown in FIG. 5. As shown in this example, each file has a location in the structure and corresponding link:

$$U_i = \text{http://localhost:8688}/G(WID)/C_i'$$

In this link, the term $C_i'$ identifies a particular content file, i.e., "movie 1". G is an encryption algorithm, e.g. E, and WID is the previously described session-specific configuration identifier which may be randomly generated (as at 60 in FIG. 4). The inclusion of G(WID) in the URL particularizes the content location in the random directory structure for the current log-on session. Since the link $U_i$ is randomized based upon the WID generated for this session, it will be totally unusable in the next and subsequent log-on sessions. Accordingly, link $U_i$ cannot be cached to permit access to the protected content in another session, since the content, "movie 1", for example, will have a different location, and a different link, in the new directory structure.

Figure 6:
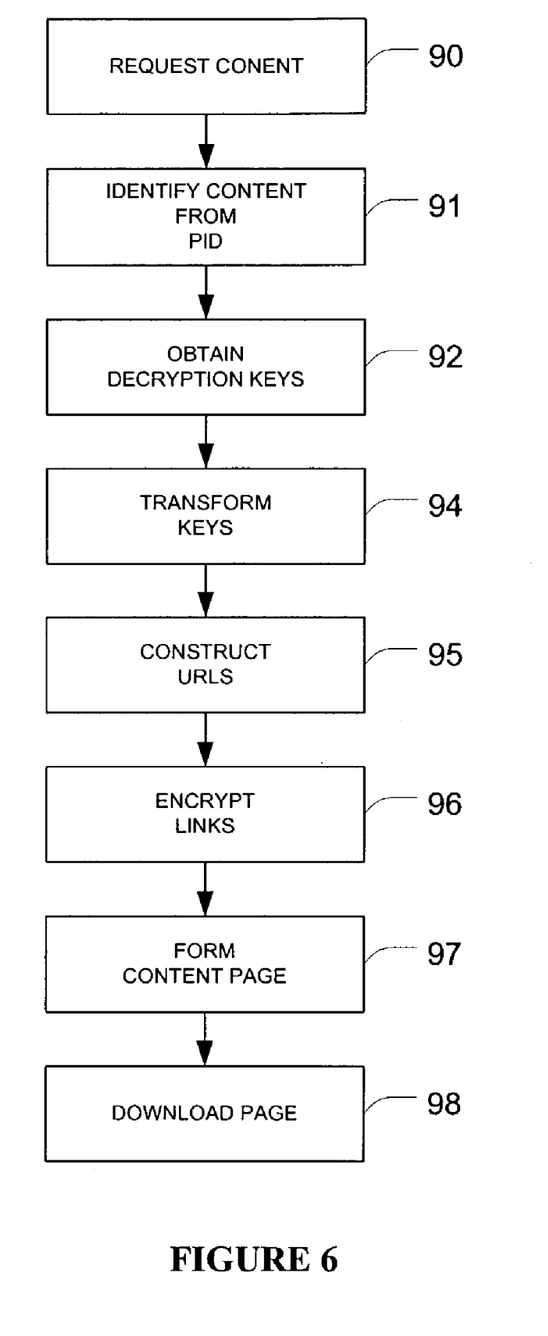
FIG. 6 is flow diagram of a process in accordance with the first embodiment of the invention for constructing a content selection page for selecting encrypted content.

The special trigger and the process for accessing selected content will now be described. The special trigger comprises links into the directory structure for the encrypted content, as described above, to which are added transformations of the decryption keys so that the content can be decrypted. The links are provided on a content page that is downloaded to the browser at the request of the user. FIG. 6 illustrates this process.

As shown in FIG. 6, upon receiving a request from the browser for content (at 90), the remote server identifies the content on the content media from the PID (at 91) and obtains the decryption keys for the content from the key file at 92. The remote server transforms the decryption keys, using a transformation function as previously described (at 94), and constructs (at 95) URLs pointing to the content on the content media using the corresponding path, the transformed key and G(WID), which is formed by the known WID for the session and the known encryption algorithm, G. The form of the content URL, $U_i$, for each content file constructed by the remote server at step 95 may be:

$$U_i = \text{http://localhost:8688}/G(WID)/C_i?k = K\_t$$

The remote server then encrypts (at 96) the URLs using the encryption algorithm, E and the previously described communications key, $WID_N$, and constructs the content page (at 97) using the encrypted URLs, and downloads the content page to the browser (at 98). The form of the encrypted URL, $U_i'$ at step 96 may be:

http://localhost:8688/AERYHAEGADRGAERFASD-FEDAFW

At the user, the page with the encrypted links may be downloaded to the browser main frame 58, and displayed to the user. When the user selects a content file, the corresponding URL, $U_i'$, is uploaded from the browser to the local server. The executable program will receive the entire encrypted URL as a character string, and attempt to decrypt the link using the decryption program 43 using the transformed decryption algorithm, D_t( ), and communications key, $WID_{N\_r}$. If decryption is successful, i.e., the link contains a meaningful URL, the local server will process the decrypted URL to obtain the link to access the encrypted content in the virtual structure on the content media. The accessed content will then be read by the media player 47, in the case of audio and/or video, for example, or executed if the content is an executable program.

In the case of streaming video or audio multimedia content, the data is preferably in MPEG format. MPEG-1 is a standard for VCD, and MPEG-2 is a standard for DVD. This format stores the data in a time sequence manner with the early part of the data stored first, and the later part stored last. With this format, the player need not have the entire content file decrypted before it is able to begin delivering content. Typically, a streaming media player will begin to play as soon as it receives sufficient data, and will continue to play while it is simultaneously loading the remaining data. Player 47 is preferably the Windows Media Player, as mentioned. The player includes a codec for decoding the encoded MPEG data, and a program for rendering the audio and video data such that the audio and video are synchronized and played at the same speed as the original content. The player may also include memory buffers for the data which are filled as the data is decoded and decrypted. The buffers temporarily hold sufficient data to enable the player to render the audio and video correctly without gaps or skips, i.e., without dropping frames.

The invention decrypts blocks of a predetermined size of encrypted data in the temporary file, for example, on the hard disk, in a moving time window that is synchronized with the system clock. The size of the time window is selected based upon the rates at which data can be decrypted and decoded, the original playing speed of the multimedia, the size of the memory buffers, and the rendering rate of the player.

Media players, such as the Windows Media Player, typically access a file in a non-exclusive access mode which allows other programs to read and write to the file simultaneously. This is convenient, for example, to provide separation between network data accesses and other programs, and simplifies the media players. The invention advantageously uses this characteristic of accessing data in a non-exclusive mode to enable decrypted data to be scrambled after it has been provided to the player for rendering. This enables the amount of unencrypted data in the temporary file to be minimized and reduces the possibility of it being copied. In the case of the Windows Media Player, it accesses .wmv files, an MPEG video format, and .wma files, an MPEG audio format, using non-exclusive access mode.

Figure 7:
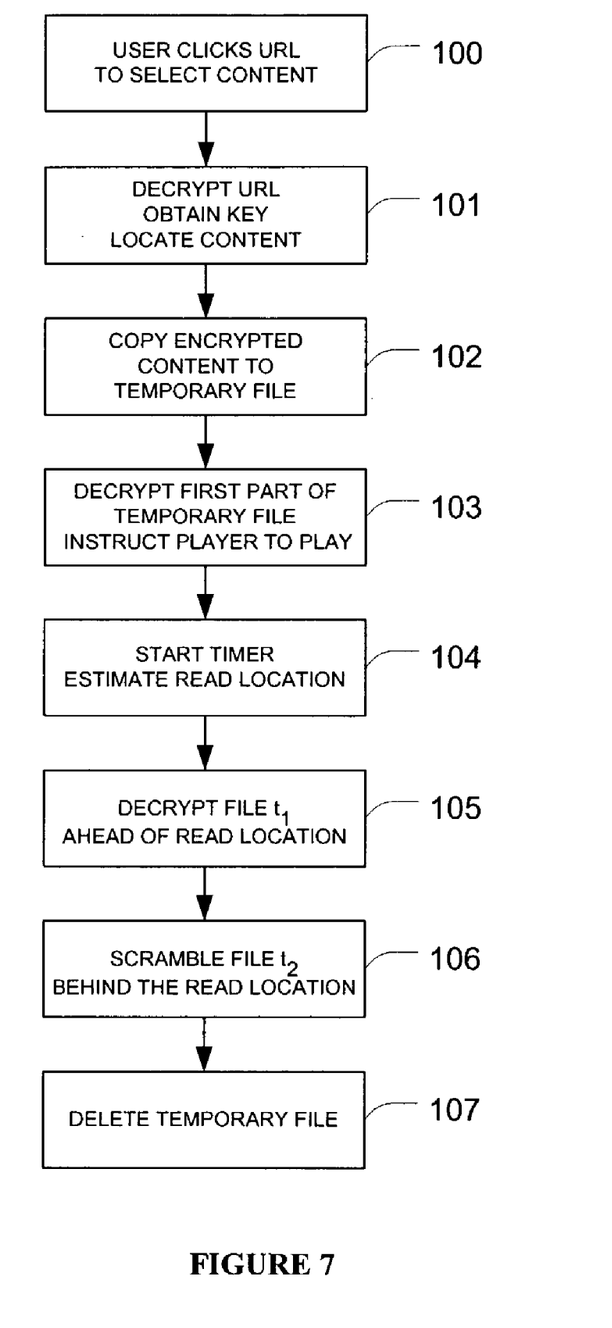
FIG. 7 is a flow chart of a process in accordance with the invention for playing selected streaming media content.

FIG. 7 is a block diagram that illustrates the process of selecting, decrypting and rendering data from the downloaded content page. Upon a user clicking on the encrypted HTML URL link on the page to select encrypted content (at 100), the executable program receives the request, decrypts the URL to obtain the corresponding decryption key, and locates the encrypted content using the decrypted location (at 101). The executable program then copies the encrypted content from the repository on the content media to a temporary file as, for example, on the hard disk (at 102). The executable program creates the temporary file in a non-exclusive access mode which allows other programs to read and write to the file. At 103, the executable program decrypts the first part of the temporary file, and instructs the media player to play the temporary file. It does this by issuing a command to the operating system of the user computer to start the media player and to begin playing the file. Since the executable program accesses the temporary file non-exclusively, this enables the media player to access the file simultaneously with the executable program and begin playing it. At 104, the executable program starts an internal timer which it uses to estimate the read location of the temporary file based upon elapsed time. Since the player plays at a predictable speed, the timer permits the file reading location to be estimated reasonably accurately without the need for access to the internal operation of the media player.

At 105, the executable program decrypts the encrypted temporary file at a predetermined period of time, e.g., $t_1$ seconds, ahead of the location of the file being read by the player. The time is selected to ensure a continuous, uninterrupted supply of unencrypted data to the player. The executable program determines the read location of the file based upon the elapsed time since the player began reading the data. After the data is read, data at locations corresponding to a second predetermined time, e.g., $t_2$ seconds, following reading is scrambled (at 106) as by overwriting the previously played data at those locations. This prevents the file from being replayed.

Finally, at 107, the executable program may use the timer to determine when the media player has finished reading the content file. Once the time required for reading the file has safely passed, the executable program may delete the temporary file from the hard disk. It may be necessary for the player to release control of the temporary file in order to delete it, which will occur as soon as the player begins to play another file.

Selecting the first and second predetermined time periods at which the temporary file is decrypted and then scrambled is equivalent to using a moving decryption window that decrypts several seconds of encrypted data, allows the player to present it to the user, and then scrambles the decrypted data so that it cannot be replayed or copied to another location. Accordingly, there will be no time during which the entire temporary file is completely decrypted. Thus, even if the temporary file locations which are decrypted could be located on disk by a user and copied to another location, the copy will contain at most only a few seconds of unencrypted content and the remainder of the file will be unplayable. The advantages of this technique include never having a complete decrypted copy of the content, which prevents copying and not directly interacting with the media player, which allows for cross-tool and cross-platform compatibility.

After the user finishes accessing the desired content, the executable program may begin a shutdown process. This can occur automatically upon removal of the content media, such as a CD-ROM, from the drive, or automatically under control of the executable program after the content has been played. The shutdown process will stop the HTTP services of the local server so that it will not accept any new requests from the browser, and will, preferably, de-initialize the library in the executable program using an opposite sequence from that which was used to initialize the library. The library can then be unloaded. After unloading, other logic in the executable program may be employed for deleting the library files and other temporary files created during the log-on session.

Figure 8:
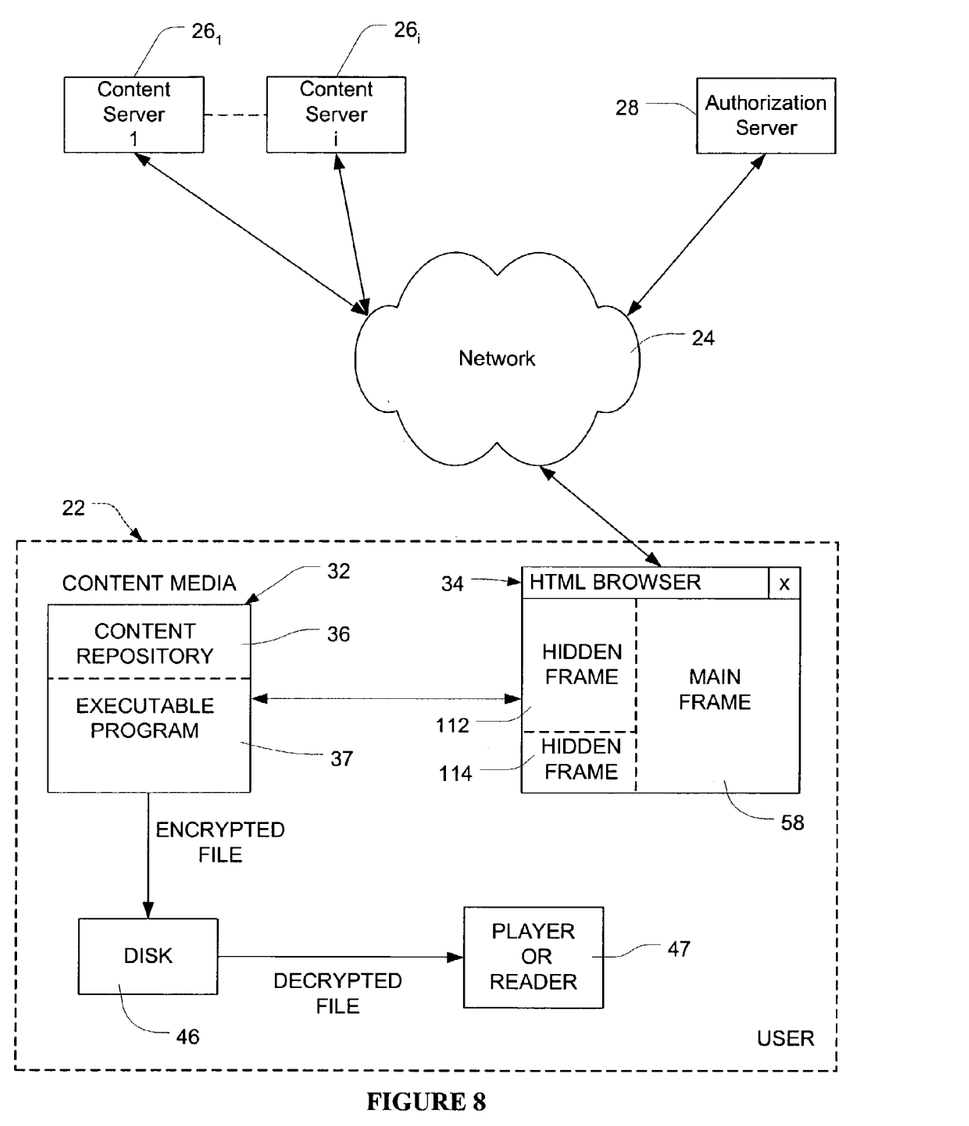
FIG. 8 is a block diagram of a second computer network system with which the invention may be employed.

The first embodiment of the invention described in the foregoing combined the authorization server and content server functions and operations in a single remote server, as indicated in FIG. 1. FIG. 8 illustrates another system arrangement in which the content server 26 and authorization server 28 are separated from one another, and may be in different computers at separate physical locations. In fact, there may be a plurality of content servers 26–26' corresponding to a plurality of content owners, each identified by a separate vendor identifier (VID). With the system arrangement of FIG. 8, according to a second embodiment of the invention, each content server 26–26' may perform, for its corresponding respective content, the functions previously described for the content server of the first embodiment. In this respect, a content server upon being contacted by the browser using the server's URL, may download a log-on page to the user's browser 34, verify the user's identity, and authorize access to its content.

Upon verification of the user's identity, the content server may download a page to the browser along with the vendor identifier (VID) corresponding to the content owner and a hidden frame 112 containing JavaScript for detecting the content media and loading a page from the executable program, as previously described. When the browser 34 first receives a page uploaded from the local server on the content media, the page contains the configuration identifier WID generated by the WID generator of the executable program, the product identifier PID, and a field for the session identifier SID which is initially empty since it is assigned by the authorization server. These identifiers may be combined with the vendor identifier VID from the content server and autosubmitted to the authorization server 28, in the manner previously described. The authorization server responds by downloading to the browser into the hidden frame 112 a message encrypted by the first communication security key $WID_d$, as previously described and containing SID, $WID_{N\_p}$, D_t( ), a library patch, and encrypted URLs for the content on content media 32 to which the user has been authorized access. This message is autosubmitted to the executable program on the content media where it is decrypted in the mainer previously described. The executable program then constructs a content selection page and uploads the page to the main frame 58 of the browser 34. (This differs from the first embodiment where the content selection page was constructed and downloaded to the browser from the authorization server.)

The remainder of the access process is substantially as previously described. When the user selects content from the content page, the encrypted URL is provided to the executable program on the content media which decrypts the URL using the previously supplied content decryption keys embedded in the encrypted URLs supplied from the authorization server. The executable program decrypts the selected content from the temporary file on hard disk, and provides the decrypted content to a player for rendering in the manner previously described.

Thus, a principal difference between the processes of the first and second embodiments is that in the first embodiment the authorization server constructs and downloads the content selection page to the browser to enable selection of content by the user. In the second embodiment, by contrast, the executable program constructs the content selection page and uploads it to the browser.

The network system configuration of FIG. 8 may be used to support a third embodiment of the invention, as will now be described. In this third embodiment, there may again be a plurality of content servers 26–26' as shown, each corresponding to a different content provider and each having a corresponding vendor identifier VID. As with the second embodiment, there may be a single authorization server 28 which manages the encryption and decryption functions for the content on the content media, and which communicates with the browser to provide the decryption algorithms and keys for the particular content to which the user has authorized access. In this third embodiment, however, each content server separately constructs and downloads a different content selection page to the browser corresponding to its particular content media, after the user has logged on to the content server and been authorized access to the associated content.

As in the second embodiment, when the user logs on to a particular content server by using the URL for that server, the content server downloads to the user a corresponding VID and a hidden frame, and the remote server uses the VID to identify the particular vendor or provider of content to which the user has been granted access. The authorization server uses the VID, as well as the PID, to access the keys for the content which are stored in the key file of the server, to construct the encrypted URLs containing the location of content in the media and its transformed decryption key, and to download a list of encrypted URLs to the browser in order to enable the content selection page to be constructed.

In the third embodiment, in addition to providing the vendor identifier VID, the content server also provides a vendor session identifier (VSID) in order to identify the user for the current log-on session during subsequent communications between the browser and that content server. Communications between the browser and content server are necessary in the third embodiment since the particular content server to which the user has logged on constructs and downloads the content selection page to the browser for the content stored on its corresponding content media. In order to accomplish this, the content server is provided with the encrypted URLs containing the location of all content in the media and the transformed decryption keys downloaded from the authorization server. These keys and the associated VSID are downloaded to a second hidden frame 114 (see FIG. 8) of the browser that includes an auto-submit function for communicating the downloaded keys and the VSID to the content server. The content server does not have access to the communications security keys or to the unencrypted transformations of the keys. Rather, the content server merely utilizes the encrypted URLs to construct the content selection page which is downloaded back to the browser.

When the user selects content to be accessed from the content selection page, the process for locating the encrypted content and decrypting it is as previously described in connection with the first and second embodiments. The third embodiment is similar to the first embodiment in that the content selection page is downloaded from a remote server (the content server), whereas in the second embodiment, the content selection page is constructed and uploaded from the executable program to the browser. The advantages of the second and third embodiments are that a single authorization server can manage the encryption and decryption functions for content provided by a plurality of different content servers, each of which individually authorizes access by the user to its corresponding content media.

While the foregoing has been with reference to particular embodiments of the invention, it will be appreciated that changes to these embodiments may be made without departing from the principles and the spirit of the invention, the scope of which is defined by the appended claims.

The invention claimed is:

1. A method of controlling access by a user to encrypted content on content media at the user, comprising instantiating at the user a current instance of an executable program stored on the content media, the executable program generating a configuration identifier that is unique to the current instance of the executable program; creating, using the configuration identifier, a virtual directory structure for content on the content media, the content having a location within the directory structure that depends upon the configuration identifier and which has a corresponding path; communicating with a remote server for access authorization by said user; providing to the user information on selectable content and the corresponding path of such content; and providing to the user from said remote server a decryption key for decrypting selected content.

2. The method of claim 1, wherein said content comprises a plurality of content files, each file having a separate location within the directory structure and a separate corresponding path.

3. The method of claim 1, wherein said providing to the user information on selectable content comprises providing encrypted information on said content and on said corresponding path, the information on said corresponding paths comprising a URL identifying a location within the directory structure of said content.

4. The method of claim 1 further comprising encrypting at the remote server said information provided to the user using a first encrypting process and a first encryption key; and downloading to a browser at the user a page containing said encrypted information.

5. The method of claim 4 further comprising downloading to said executable program a first transformation of a decryption program and a second transformation of said encryption key for decrypting the encrypted information on said page.

6. The method of claim 5, wherein said first and second transformations are different transformation processes and are unique to a current access session.

7. The method of claim 6, wherein said second transformation process comprises combining said first key with a number to form a combination, and encrypting said combination using a second encryption process to produce said second transformation of said encryption key, and wherein said first transformation process of the decryption program comprises decrypting the encrypted combination to recover the first encryption key, and decrypting using a different decryption process and said decrypted key the encrypted information on said page.

8. The method of claim 1, wherein said executable program comprises a local server, and said communicating with said remote server comprises communicating with said local server via a browser at the user.

9. The method of claim 1, wherein said generating a configuration identifier comprises generating with the executable program a random number; and said step of creating a virtual directory structure comprises creating a location within the directory structure for said content using said random number.

10. The method of claim 9 further comprising providing said configuration identifier to the remote server, and forming at said remote server a path corresponding to the location in the directory structure of said content using said configuration identifier; and wherein said providing of information to a user on selectable content comprises providing to the user a description of said content and the corresponding path.

11. The method of claim 10 further comprising encrypting said information at said remote server, and decrypting said information in the executable program to recover the content description and path.

12. The method of claim 1, wherein said instantiating comprises running a first portion of the executable program which creates a local server; and said generating a configuration identifier comprises running a second portion of the executable program to produce an unpredictable number, said configuration identifier comprising said unpredictable number.

13. The method of claim 12, wherein said remote server comprises one or more content servers and an authorization server, and the method further comprises authorizing, in a content server, access by the user during a current access session to encrypted content on the content media; and supplying to the user a session identifier identifying said access session, and wherein said providing to the user information on selectable content comprises uploading from the user to the authorization server the session identifier and a content media identifier; and downloading from the authorization server in response to said identifiers information on selectable content.

14. The method of claim 1, wherein said content comprises multimedia data, and said content media comprises a data storage device.

15. The method of claim 14 further comprising storing encrypted multimedia data content selected by the user in a temporary file; decrypting the encrypted data in said temporary file in a moving time window; and scrambling the decrypted data in said temporary file following rendering.

16. A method of controlling access by a user to encrypted content on content media at the user, comprising storing on the content media encrypted content files, each file having an associated key; providing on the content media an executable program, the executable program comprising a first portion operating as a server, a second portion generating a unique identifier for each instantiation of the program, a third portion creating for each instance of the executable program a virtual directory structure for the content files on the content media, the content files in the directory structure having locations in said directory structure determined by the unique identifier and said locations having corresponding paths, and a fourth portion for decryption; authorizing by a remote server user access to the encrypted content; and communicating to the executable program after said authorizing an associated key for decrypting an encrypted content file selected by the user.

17. The method of claim 16 further comprising providing a browser at said user for communicating between the first server portion of the executable program on the content media and the remote server; and downloading to the browser a page having a main frame for displaying information to the user and having a hidden frame with a program for communicating with the server portion of the executable program.

18. The method of claim 17 further comprising uploading from the user to the remote server said unique identifier and a content media identifier; receiving from the remote server an encrypted message comprising a decryption program for use with said associated keys for decrypting encrypted content, and receiving a security key for decrypting communications between the remote server and the user during said access session.

19. The method of claim 18 further comprising generating using said unique identifier in said executable program a decryption key for decrypting said encrypted message from the remote server.

20. The method of claim 18, wherein said security key and said decryption program received from said remote server comprise a first transformation of a security key and a second transformation of an encryption program for encrypting communications between the remote server and the user, said transformations enabling decryption of communications only during the current access session.

21. The method of claim 20, wherein said first transformation of the security key and the second transformation of said decryption algorithm comprise different transformations.

22. The method of claim 16, wherein said remote server comprises one or more content servers and an authorization server, and wherein said authorizing user access comprises authorizing user access by a content server, and said communicating of said associated key for decrypting comprises communicating said key from the authorization server.

23. The method of claim 22, wherein said authorizing user access by said content server comprises downloading to the user a vendor identifier; communicating from the user to the authorization server said vendor identifier and said unique identifier generated for the current instance of the executable program; and receiving at the user from the authorization server transformations of associated keys for decrypting the encrypted content files on the content media and another transformation of a decryption program for said decrypting, said transformations being specific to the current instance of the executable program.

24. The method of claim 23 further comprising receiving at said user from said content server a content selection page containing a description of selectable content files on the content media and the corresponding paths in said directory structure for said selectable content files.

25. The method of claim 24, wherein said corresponding paths for content files comprise URLs which indicate said locations in the directory structure of said files, and said receiving comprises receiving said paths in an encrypted communication on a hidden frame in a browser of the user.

26. The method of claim 25 further comprising uploading said encrypted communication from the browser to the first server portion of the executable program; and decrypting the encrypted communication using the fourth portion of the executable program.

27. The method of claim 22 further comprising receiving from the authorization server on a hidden frame of a browser URLs for the corresponding paths of said content files in the directory structure; uploading said URLs to the executable program; constructing in the executable program a content page identifying selectable content and associated URLs; and downloading the content page from the server portion of the executable program to a main frame of the browser for display to the user.

28. The method of claim 27, wherein said URLs are encrypted, and the method further comprises decrypting in the executable program an encrypted URL corresponding to a selected content file.

29. The method of claim 22, wherein there are a plurality of content servers, each content server being identified by a vendor identifier and having a corresponding group of encrypted content files to which such content server grants user access; and wherein said authorization server stores in a key file keys for the encrypted content files of said plurality of content servers.

30. The method of claim 16, wherein said encrypted content files comprise multimedia data; and wherein said executable program stores a content file selected by a user in a temporary file; decrypts a portion of the content file in the temporary file in a moving time window; and scrambles the decrypted portion of the content file in the temporary file following rendering.

31. The method of claim 16, wherein said encrypted content is selected from the group consisting of digital data and executable programs.

32. The method of claim 16, wherein said content media comprises storage media selected from the group consisting of optical storage, magnetic storage, and semiconductor memory.

33. A method of controlling access by a user to encrypted content on content media at the user, comprising instantiating at the user a current instance of an executable program stored on the content media; generating with the executable program upon instantiation a configuration identifier that is unique to the current instance of the executable program; communicating with a remote server for access authorization by said user, comprising providing said configuration identifier to the remote server; providing to the user information on selectable content; and providing to the user from said remote server in a message encrypted using said configuration identifier a decryption code and a decryption key for decrypting selected content.

34. The method of claim 33 further comprising creating for the current instance, using the configuration identifier, a virtual directory structure for content on the content media, the content having a location and a corresponding path within the directory structure which depend upon said configuration identifier.

35. The method of claim 33, wherein said providing to the user information on selectable content comprises providing a path for said selectable content which is encrypted using said configuration identifier.

36. A method of controlling access by a user to encrypted content on content media at the user, comprising instantiating at the user a current instance of an executable program stored on the content media; communicating with a remote server for access authorization by said user; providing to the user information on selectable content; and providing to the user from said remote server a first transformation of a decryption code and a second transformation of a decryption key for decrypting selected content, said first and second transformations being unique to the current instance.

37. Content media for controlled access to encrypted content by a user, comprising a repository on the content media storing encrypted content files; an executable program on the content media executable by a computer of the user, said executable program comprising a local server for communicating with a browser of the user; a configuration identifier generator operable upon instantiation of the program to generate a unique configuration identifier corresponding to a current instance of the executable program; first program code for creating upon said instantiation of the executable program a virtual directory structure for the encrypted content files stored in said repository, the content files having locations within said directory structure during said current instance determined by the configuration identifier, and said locations having corresponding encrypted paths; and second program code for receiving from said browser keys for decrypting an encrypted content file selected by the user for access and the corresponding encrypted path.

38. The content media of claim 37, wherein said configuration identifier generator comprises a random number generator which generates a different random number for each instantiation of the program, and the first program code includes an encryption program for encrypting said random number, the encrypted random number being used for creating said virtual directory structure.

39. The content media of claim 38, wherein said first program code assigns to each encrypted content file a location within said virtual directory structure that is determined by said encrypted random number, and wherein said encrypted path for such location comprises a URL formed using said encrypted random number.

40. The content media of claim 39, wherein said executable program comprises a shell program and a library which is updatable via the browser to change the operations of the executable program.

41. The content media of claim 37 further comprising a URL within the content media that indicates a network address for a remote server, and wherein the local server communicates with the remote server via the browser to authorize access to the content media by the user.

42. The content media of claim 37, wherein said content media comprises a storage device, and the content media further includes a program that comprises a parameter file which cooperates with the user's computer for automatically instantiating the executable program.

43. The content media of claim 37, wherein said content media is selected from the group consisting of optical storage devices, magnetic storage devices, and semiconductor memory.

44. The content media of claim 37, wherein said encrypted content files comprise multimedia data.

45. The content media of claim 37, wherein said executable program further comprises program code having a first portion for writing an encrypted content file to a temporary file; a second portion for accessing the temporary file in a non-exclusive access mode; a third portion for decrypting preselected parts of the encrypted temporary file in a moving time window; and a fourth portion for scrambling the decrypted parts of the temporary file at a predetermined time following decryption.

* * * * *